United States Patent Office

Re. 25,438

Reissued Aug. 27, 1963

25,438

PROCESS FOR THE GROWING AND ROOTING OF PLANTS IN A SYNTHETIC SOIL

Florian N. Nelson, P.O. Box 124, Vicksburg, Miss.

No Drawing. Original No. 2,891,355, dated June 23, 1959, Ser. No. 679,759, Aug. 22, 1957. Application for reissue June 13, 1961, Ser. No. 120,122
7 Claims. (Cl. 47—58)

Matter enclosed in heavy brackets [ ] appears in the original patent but forms no part of this reissue specification; matter printed in italics indicates the additions made by reissue.

This invention relates to the growing of plants without the use of soil and it has for its principal object to provide a suitable medium in which certain species of plants will grow either for a long time or even for an indefinite time. *It particularly relates to the method of preparation and the uses of artificial soil.*

Many chemical agricultural systems have been proposed. They are usually based on so-called "water culture" (or "sand culture") but these systems have only been successful under very specialized conditions, when special treatment of the plants and constant supervision by experts could be provided. Also these systems were intended to grow crop plants.

This invention is essentially [connected] *concerned* with a process *for preparing an artificial soil and the uses of such a soil in the method* of growing plants which are usually grown in beds or flower pots, as distinguished from crop plants for which the chemical agricultural system was mainly designed. The method of growing plants must therefore be simplified. This result is obtained by using an artificial substitute for the soil in which such plants are usually grown which consists of synthetic material holding all the nutrient chemicals which the plants are in need of and also conducting the said chemicals toward and holding the plant roots in contact with said chemicals. This multiple use of the synthetic material forming the substratum is indispensable, because, in order to be able to use the system in homes, preparatory steps of a more complex kind must be eliminated and only the simplest possible manipulations such for instance as the addition of water can be expected to be performed.

The artificial substitute for the soil consists of a synthetic resin material holding the chemical plant nutrients and an agent promoting capillary action as well as disinfecting or parasiticidal substance. This synthetic resin material must have a number of desirable properties in order to be usable in the manner indicated. It must not only have a very large surface and permit capillary fluid conduction but it must permit the intake and the exhalation of gases and it must further provide a stratum or layer in which the roots of the plant find a suitable grip.

As will be clear it is a major advantage to be able to cultivate plants and especially foliage plants by means of what is called "chemical agriculture," feeding essentially those minerals and other compounds which can be utilized by the plants to greatest advantage, within a uniform medium which can be fully surveyed and does not contain all kinds of unknown ingredients and unknown parasites. Further, the medium also should not attract parasites of any kind.

A special characteristic advantage however is seen in the use of a decorative synthetic material which has itself a neat and decorative appearance or which is even decorative to such a degree that transparent containers may be used through which the material may be displayed enhancing the colorful appearance of the plants by contrast or by matching of the colors.

*This product consisting of a synthetic base material in attractive colors, with its added germicidal agents and*

*mineral nutrients, has many advantages over the use of soil for growing practically disease free plants.*

*In like manner these advantages extend to human beings. The proven theory of Color Dynamics applies to persons in this instance. The cleanliness and novelty as well as the beauty of healthy plants growing in rooms where persons are sick has therapeutic value. The variety of color in which this artificial soil can be made increases this value, as some colors are stimulating, other colors are soothing. The semi-sterile media controls to a large degree those germs found in dirts and fertilizers, thus decreasing the hazards of soil borne germs where food is served or where illness is already present.*

*This product being free of the billions of microorganisms that soil is host to is an invaluable aid in laboratory test work. In many instances, soil must be sterilized in the laboratory before certain tests can be successfully done. Only germs and microorganisms that are carried on roots and seeds of plants are present in this artificial soil. The mineral nutrients are uniform and can be surveyed at all times without expensive analysis as is the case with natural soils. Thus many hours and costly preparatory steps to make ready ideal conditions can be eliminated with the use of this product with its germicidal and nutritive properties.*

The material best suited according to the invention which has all the desirable properties above mentioned, and which is suitable for chemically cultivating plants consists of crushed or shredded *expanded plastic foam such as expanded polystyrene identified as* "Styrofoam," a polystyrene plastic made by inflating polystyrene cells with air [, produced by the Dow Chemical Company, under the above trade name]. *Many other expanded plastic foams are equivalents to Styrofoam in the practice of this invention.* Styrofoam is a non-permeable multi-cellular expanded product which contains about 97% of air by volume. The material thus has a very large number of cavities and cells. It may be produced in any color or may be colored after production and it is extremely light in weight, a factor which counts in connection with decorative articles for the home. When shredded so as to form small pieces the surface and air content per unit of volume is considerably increased.

The shredded [Styrofoam] *expanded plastic foam such as expanded polystyrene, made by either a wet or dry process* is impregnated according to the invention in a manner described below with a suitable selected plant nutrient solution and with a detergent solution reducing the surface tension. This combination is necessary in order to produce a desired capillary action which action serves to provide the roots of the plants with the nutrients.

The substratum or medium in which the plants are grown thus essentially consists of the impregnated [Styrofoam] *expanded foam or polystyrene* shreds and of water which must be supplied by the user.

The use of the shredded cellular polystyrene material produces a special advantage, denied to plants grown in *natural soils in* a pot of ceramic material, namely that the access of oxygen to the roots is more freely had than it is in any pot or soil filled container *because such materials do not become dense or compacted when wetted.* During growth, the roots of the plant need large quantities of oxygen which usually cannot be fully supplied in small pots. Thus the chemical system of growing approaches very much the ideal way of growing plants for ornamental purposes.

Likewise the escape of waste gases from the roots and especially the escape of carbon dioxide is complete and is much easier performed than the escape in the case of plants enclosed in small earth filled containers.

The decorative properties of the colored cellular

[polystyrene] *base material* such as Styrofoam show off to best advantage within a transparent container which may or may not be colored. However cultivation of plants in the manner indicated may take place in any vase, box or bed or even pot as the accessibility to view or to light is not essential and the advantages above mentioned would not be diminished by enclosing the cellular material on account of the air space available. The method of using the impregnated cellular material is moreover especially of advantage when used in connection with root cuttings which, if made to grow in a transparent container, are accessible to view and thus may form a valuable teaching aid.

Observations have shown that African violets, coleus, and hard to root species root very easily in the medium according to the invention.

EXAMPLE

Crushed or shredded *based material such as* "Styrofoam" [manufactured, and marketed by the Dow Chemical Company,] may first be mixed with a paint of the desired color which may contrast with or harmonize with the colors of the plants or flowers to be grown, if "Styrofoam" of the desired color is not available.

One bushel of the white crushed or shredded Styrofoam is then sprayed with one-half gallon of a solution prepared in the following manner:

To prepare the solution one gallon of water is used to which a detergent is added. Most surface active synthetic detergents are suitable for this purpose. Examples are the detergent marketed under the name "Aerosol" OT 10% solution. About 10 drops of this detergent are added to one gallon of water. Another detergent which may be used on account of its disinfecting and parasiticidal properties is Zephiran chloride, which is a cationic detergent consisting of a mixture of high molecular alkyl dimethyl benzyl ammonium chlorides. About 4 drops of this detergent are added to each gallon of water. Other detergents for instance one consisting of dimethyl benzyl dodecyl ammonium chloride may be used which also has parasiticidal properties.

The nutrient solution is prepared by adding to the above solution the following compositions, the proportions being in this case stated in gram per liter.

| | Grams per liter |
|---|---|
| $MgSO_4—7H_2O$ | 0.780 |
| $Ca(H_2PO_4)_2$ | 0.405 |
| $KNO_3$ | 0.770 |
| $CaSO_4$ | 1.425 |
| $FeSO_4$ | 0.0025 |
| $MnSO_4$ | 0.0015 |
| $H_3BO_3$ | 0.0020 |
| $CuSO_4$ | 0.0001 |
| $ZnSO_4$ | 0.0001 |

These quantities are of course not absolutely fixed, the proportions varying to a certain extent. Essentially the nutrient solutions for growing plants should contain the following concentrations of soluble mineral substances.

| | Parts per million parts of water |
|---|---|
| Potassium | 390 |
| Calcium | 80 |
| Magnesium | 24 |
| Nitrogen | 200 |
| Phosphorus | 65 |
| Sulphur | 32 |
| Iron | 0.10 |
| Manganese | 0.50 |
| Boron | 0.50 |
| Copper | 0.025 |
| Zinc | 0.025 |

Solutions of this type are in fact actually manufactured and marketed. After adding such a solution to the shredded Styrofoam it should be allowed to dry for at least 24 hours or more.

Then for every 7 gallons of colored [Styrofoam] *base material* one gallon of the white prepared [Styrofoam] *base material* is added. Then water is added filling the volume which is filled by the crushed Styrofoam about ¾ full of water.

If it is desired to insert a plant into a container, the roots of the plant should be cleaned and a container of a suitable size selected in accordance with the plant species to be grown in it. The container should be filled about half full of shredded [Styrofoam] *base material* prepared in the manner above described. The plant should be inserted upright and the shredded [Styrofoam] *base material* should be filled around the roots until the plant is firmly rooted. Then the container should be filled with about ¾ full of plain water.

For rooting plants water is to be added to the shredded [Styrofoam] *material* in the proportion above indicated with the foliage spread above the water.

The shredded [Styrofoam] *base* material may be prepared in the manner above stated with a nutrient and a detergent added and dried and may be marketed in this condition.

The cellular polystyrene plastic thus provides not only a specially favorable medium for growing plants in which plants root readily, but simultaneously also privides a special medium of high decorative quality which is unusual and outstanding and thus permits to provide especially attractive arrangements suitable not only for homes but also for window displays, hotel lobbies, restaurants, hospital rooms, and many other places where an especially decorative and attractive arrangement is needed. Its light weight greatly facilitates handling.

*The addition of the germicidal agent makes this product sterile of all microorganisms carried in soils, except those carried on the roots and seeds of plants. Such disease germs as anthrax, typhoid and tetanus and amoeba, hook worm and other intestinal parasites to which soils and fertilizers are host, are usually controlled by the germicidal agents. Thus hazards of plants grown in sick rooms or on tables where food is served are decreased. Also the novelty of the colored artificial soil and the beauty of arrangements possible with its use has good therapeutic effect on sick persons.*

*Thus the use of this product approaches nearly the ideal method of growing healthy plants free of soil borne diseases and is beneficial for use in homes, hospital rooms, or places where food is served.*

It will be obvious that certain changes may be made, especially with respect to the detergent and the nutrient used, without in any way departing from the essence of the invention as defined in the annexed claims.

What is claimed as new is as follows:

1. The method of growing plants by chemical agricultural process which consists in preparing shredded cellular expanded polystyrene by adding to a bushel of said polystyrene one-half gallon of a solution containing plant nutrients and several drops of a surface tension lowering detergent, in drying the shredded cellular expanded polystyrene during approximately 24 hours, in placing the roots of the plant to be grown into a quantity of shredded cellular polystyrene, adding the said prepared shredded cellular expanded polystyrene in the proportion of 7:1 and in adding water approximately to the extent of ¾ of the volume occupied by the shredded cellular polystyrene.

2. A method of chemical agriculture for growing and rooting plants which consists in preparing artificial soil comprising exclusively cellular expanded polystyrene, shredded into small pieces, the shreds surrounding a plant stem and root inserted into the artificial soil in large numbers, impregnating the expanded shredded polystyrene with a plant nutrient solution containing chemical nutrient agents after adding to the said solution a wetting agent, in preparing a bed containing a mixture of unprepared shredded cellular expanded polystyrene and prepared shredded cellular expanded polystyrene, adding water and in inserting the plant with its roots embedded between the shreds surrounding the plant and root and stem in large numbers into the shredded cellular expanded polystyrene.

3. A method of chemical agriculture for growing and rooting flowers which consists in preparing artificial soil comprising exclusively cellular expanded polystyrene, shredded into small pieces, the shreds surrounding the stem and root inserted into the artificial soil in large numbers, impregnating the expanded shredded polystyrene with a plant nutrient solution containing chemical nutrient agents after adding to said solution a wetting agent, in mixing the shredded cellular with paint before being impregnated for coloring it to add to its decorative properties, in preparing a bed containing a mixture of unprepared shredded cellular expanded polystyrene and prepared shredded cellular, expanded polystyrene, adding water, and in inserting the flower with its roots embedded between the shreds surrounding the flower stem and root in large numbers into the shredded cellular expanded polystyrene.

*4. The method of preparing artificial soil by chemical agriculture process which consists in preparing shredded cellular expanded polystyrene by adding to a bushel of said polystyrene one-half gallon of a solution containing plant neutrients and several drops of a surface tension lowering detergent, in drying the shredded cellular expanded polystyrene during approximately 24 hours, mixing untreated shredded cellular expanded polystyrene with the said prepared shredded cellular expanded polystyrene in the proportion of 7 : 1 and in adding water approximately to the extent of ¾ of the volume occupied by the shredded cellular polystyrene.*

*5. A method of preparing artificial soil comprising cellular expanded polystyrene foam shredded into small pieces, impregnating the expanded shredded polystyrene foam with a plant nutrient solution containing chemical nutrient agents after adding to said solution a wetting agent, in mixing the shredded cellular polystyrene foam with paint before being impregnated for coloring it to add to its decorative properties, in mixing a quantity of unprepared shredded cellular expanded polystyrene foam and impregnated shredded cellular expanded polystyrene foam, and thereafter adding water to the mixture.*

*6. The method of claim 1 wherein the surface tension lowering agent is germicidal.*

*7. The method of claim 1 wherein color is mixed with said shredded cellular expanded polystyrene for its color dynamic, decorative and therapeutic value.*

References Cited in the file of this patent or the original patent

UNITED STATES PATENTS

| | | |
|---|---|---|
| 2,446,429 | Nelson | Aug. 3, 1948 |
| 2,618,901 | Braun | Nov. 25, 1952 |
| 2,753,277 | Smithers | July 3, 1956 |
| 2,754,229 | Fredenburg | July 10, 1956 |
| 2,820,703 | Dresser | Jan. 21, 1958 |
| 2,951,753 | Groves | Sept. 6, 1960 |

FOREIGN PATENTS

| | | |
|---|---|---|
| 920,487 | Germany | Nov. 22, 1954 |

OTHER REFERENCES

1950 Modern Plastics Encyclopedia and Engineer's Handbook, N.Y., Plastics Catalogue Corp., 1950, pp. 800 and 801, T.P. 986, A2–M5.

Condensed Chemical Dictionary, 5th ed., N.Y., Reinhold, 1956, page 1040, QD 5, C5 (1956).

Folder published by Foliage Co. of America (Ludington, Mich.), 1949, entitled "Styrofoam E-Z Wreath Rings," 2 pages.

Modern Plastics (Magazine), vol. 28, No. 2, pp. 2, 83, 84, 85, 86, 166, 167, published October 1950, article "Foam and the Future."

Onyx Technical Data Sheet No. Ind.–6, Product Ammonyx T, published 1952 by Onxy Oil and Chemical Co., N.J., 2 pgs.

Southern Florist and Nurseryman (magazine), July 25, 1952, vol. 65, No. 18, pp. 85, 86, 87, article "Substitutes for Sand in Propagating Cuttings," by Tschirhart.

Science News-Letter, Mar. 3, 1956, vol. 69, No. 9, p. 133, article "Waste Cellophane as Gardening Aid."